United States Patent [19]

Okino

[11] Patent Number: 5,087,928
[45] Date of Patent: Feb. 11, 1992

[54] IMAGE RECORDING APPARATUS
[75] Inventor: Yoshiharu Okino, Kanagawa, Japan
[73] Assignee: Fuji Photo Film Co., Ltd., Kanagawa, Japan
[21] Appl. No.: 528,510
[22] Filed: May 25, 1990
[30] Foreign Application Priority Data
  May 26, 1989 [JP] Japan .................. 1-134416
[51] Int. Cl.⁵ .......................... G01D 9/42; H04N 1/21
[52] U.S. Cl. ..................................... 346/108; 358/296
[58] Field of Search ................. 346/108, 107 R, 160; 358/298, 296, 300, 302

[56] References Cited
U.S. PATENT DOCUMENTS
4,423,426 12/1983 Kitamura ............................ 346/108
4,521,813 6/1985 Yoshida et al. ...................... 358/296

Primary Examiner—Mark J. Reinhart
Attorney, Agent, or Firm—Sughrue, Mion, Zinn, Macpeak & Seas

[57] ABSTRACT

The image recording apparatus of the present invention receives data, such as the recording time interval for recording a predetermined unit of image information, and the speed of transmission of the image information coming from an image information source, and, based on the image information transmission speed and the scanning period of an optical deflector, sets the recording time interval for recording the image to an integer multiple of the scanning speed of the optical deflector, and determines and controls the transport speed of a recording material in accordance with the recording time interval. This image recording apparatus is adaptable to various image information sources (host, interface) with a wide range of transmission speeds without having to use an expensive buffer memory.

4 Claims, 3 Drawing Sheets

IMAGE RECORDING APPARATUS

BACKGROUND OF THE INVENTION

1. Field of the Invention

The present invention relates to an image recording apparatus, specifically to an image recording apparatus that does not require the use of an expensive memory with a large storage capacity, and one that can be connected to various image information sources with different transmission speeds.

2. Description of the Prior Art

Various types of image recording apparatuses that employ raster scanning using a laser beam have been proposed and are being put into practical use.

In this type of image recording apparatus, the image information from an image information source like image processing devices, such as an image scanner, video machine, television, computer, etc., is received in the form of an electrical signal. A laser beam modulated by the image information is reflected and deflected along a main scanning direction by an optical deflector. An image corresponding to the deflected laser beam is formed on a recording material that is transported and scanned along a subscanning direction that is generally perpendicular to the aforementioned main scanning direction. By this, the recording material is exposed to perform image recording by raster scanning method.

In this type of image recording apparatus, a storage unit such as a buffer memory is provided for storing the image information transmitted from the aforementioned image information source. One recording block, for example, a block containing a number of pages of image or a quantity of image information corresponding to one sheet or one page, is stored beforehand in this memory, and image recording is performed based on the image information stored in the memory.

In this case, in order to obtain a good image free from unevenness in densities and colors the process of image recording is performed as in the following: The light beam must be made to scan the recording material along the main scanning direction at a constant speed by making the optical deflector rotate continuously at an accurately constant speed. The optical deflector must be driven by a highly precise driver having small fluctuation in the speed of rotation. Also, the aforementioned light beam must be made to scan the recording material at a constant speed by making the aforementioned recording material move along the subcanning direction continuously at a constant speed. By the process described above, the recording material is exposed two-dimensionally.

However, even in this image recording apparatus employing the raster scanning method, image recording that produces high-quality pictures with high-gradation is still desired. In order to perform the recording of the equivalent of only one page of high quality image, the number of rasters becomes large and, consequently, the amount of image information required to record one page of high-quality image becomes large. Because of this, the speed of transmission of the image information from the image information source becomes slow relative to the recording speed of the image recording apparatus.

Therefore, in order to obtain a picture of good quality as mentioned above, image recording must be performed at a constant main scanning speed and a constant subscanning speed, the subscanning operation being performed continuously without interruption. To realize this, it is required that at least one page of image information transmitted from the image information source is first stored in a memory such as a buffer memory. The image information is then read from this memory and recording of the image on a recording material is performed.

However, usually for image information, even for monochrome images, one bit of information is needed for one pixel and, for one page of image information, a memory with a large storage capacity is required. Consequently, the image recording apparatus inevitably becomes expensive.

Further, for full color images, 8 bits of information is needed for one color per pixel; for the three colors R, G, and B, 24 bits of information is needed. Thus, a very large memory is required. Consequently, the same problem arises in that the image recording apparatus becomes very expensive.

Also, as mentioned earlier, this type of image recording apparatus is connected to various image information sources and image recording is performed based on the image information transmitted from these sources. Generally, the speed of transmission of the image information is different depending on the image information source. Consequently, because of the relation of the storage capacity of the memory and the image recording speed, a large number of varied image information sources with widely varying image information transmission speeds may not be connected to the same image recording apparatus.

BRIEF SUMMARY OF THE INVENTION

The object of the present invention is to solve the aforementioned problems encountered in the prior art by providing an image recording apparatus which can be used even when it is connected to various image information generators that transmit the image information at different speeds, and which does not require an expensive memory with a large storage capacity.

In the first aspect of the present invention, the object mentioned above is attained by providing an image recording apparatus wherein an image information coming from an image information source is received, and a light beam is modulated by this image information and deflected in the main scanning direction to cause the image to be recorded on a recording material being transported in a sub-scanning direction which is generally perpendicular to the main scanning direction; said image recording apparatus comprising:

a means for setting the recording time intervals to an integer multiple of the scanning period of the aforementioned optical deflector in accordance with the speed of transmission of the image information coming from the image information source mentioned above;

a means for receiving a predetermined unit of image information being transmitted from the image information source within the aforementioned recording time interval;

a means for recording the image corresponding to the aforementioned image information at each recording time interval; and a means for changing the speed of scanning the recording material in accordance with the recording time interval.

The second aspect of the present invention provides an image recording apparatus for recording image information transmitted from an information source on a recording material, wherein the image information transmitted from the information source is received by a light beam-source, said image information being transmitted such that a predetermined unit of image information is transmitted at a predetermined speed within a predetermined recording time interval; the image information received by the light-beam source is converted to a light beam corresponding to the image information; the light beam is deflected by means of an optical deflector in a main scanning direction, the optical deflector being moved at a predetermined scanning cycle such that the recording time interval correspond to at least one scanning periods; and an image is recorded at the predetermined recording time interval on the recording material which is transported in a direction perpendicular to the main scanning direction for a sub-scanning;

said image recording apparatus being provided with a means for setting the recording time interval to an integer multiple of the scanning period of the optical deflector, based on the image information-transmission speed from the information source;

a means for receiving the predetermined unit of the image information transmitted from the image information source within the recording time interval;

a means for recording the image on the recording material at the predetermined time interval within an effective image recording period; and a means for adjusting the sub-scanning speed of the recording material to correspond to the recording time interval.

In a preferred embodiment of each aspect, said recording time interval correspond to at least two scanning periods of the light deflector, and the image recording is carried out within one scanning period of the recording time interval, and no recording is carried out during other scanning periods within the same recording time interval.

In another preferred embodiment of the present invention, said recording time interval correspond to one image recording scanning line and the image recording is carried out within one scanning period of the recording time interval, and an energy at predetermined level independent of the level of the image information is supplied to the light beam-source at least for the image recording period included within the period starting from the position in non-recording scanning period immediately before the image recording scanning period corresponding to the completion position of the effective image recording period ending at the position in non-recording scanning period immediately after the image recording scanning period corresponding to the starting position of the effective image recording period.

DETAILED DESCRIPTION OF THE INVENTION

In the image recording apparatus of the present invention, the image information transmission speed of an image information source like an image processing device such as an image scanner, computer, etc., or the transmission time interval of a predetermined unit of image information, for example, one line of image, is detected and, based on this image information transmission speed and the scanning period of the optical deflector, the recording time interval for recording an image is set to an integer multiple of the scanning period of the optical deflector and the transport speed of a recording material is set and controlled in accordance with the aforementioned recording time interval.

In other words, a predetermined unit, for example, one line of image to be recorded, is defined, and the light source is made to illuminate only on the predetermined line to be scanned during the aforementioned recording time interval. Then, there is a non-recording state, also within this recording time interval, wherein the light sources become inactive and the next line is not scanned until the transmission of the next line of image information from the image information source is completed.

As a result, the need for a memory with a large storage capacity such as a buffer memory is eliminated, instead, it can be substituted with an inexpensive memory with small storage capacity, for example, a memory that stores one or two lines of image information. Thus, compared to the image recording apparatus of the prior art which required a memory with a large storage capacity for one page of image information, an inexpensive image recording apparatus, particularly a very cheap color image recording apparatus, can be realized.

Also, as mentioned earlier, since the recording time interval is set in accordance with the image information transmission speed of the image information source despite the fact that a memory with small storage capacity is used, various image information sources with different image information transmission speeds can be connected to the image recording apparatus.

Further, even if the timing relationship of the transmission of the image information and the image recording is adjusted through the setting of the recording time interval, a stable image recording performance can be maintained always by setting the operating speed of the optical deflector at a fixed speed and setting the scanning speed of the recording material being recorded with the image at a constant speed.

The image recording apparatus of the present invention will be described in more detail below using a preferred embodiment shown in the attached illustrations.

Figure 1:
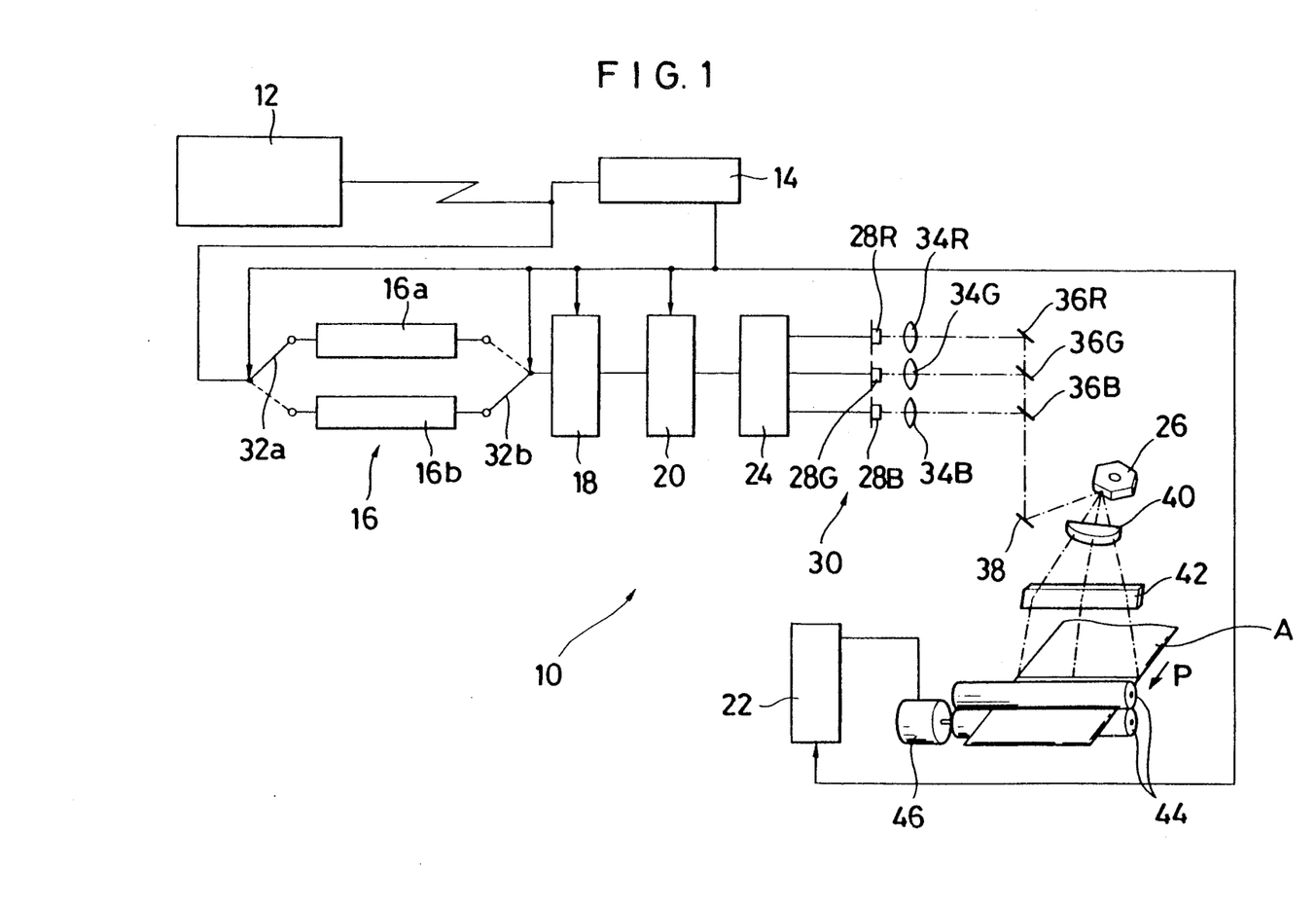
FIG. 1 is a schematic diagram showing an embodiment of the image recording apparatus of the present invention.

A schematic diagram of an embodiment of the image recording apparatus of the present invention is shown in FIG. 1.

The image recording apparatus 10 shown in FIG. 1 is connected to various types of image information sources 12, such as an image scanner, image information processing device, computer, and others, and performs color image recording on a recording material A based on the image information transmitted from the image information source. Basically, in this image recording apparatus used for recording color images, laser beams, each corresponding to the exposure of red (R), green (G), or blue (B) light depending on the image information transmitted from the image information source, are emitted and deflected in the main scanning direction by means of an optical deflector, and scans the recording material A being transported in the direction shown by the arrow "P" to expose the recording material A two-dimensionally.

This image recording apparatus 10 detects the transmission speed of the image information coming from the image information source 12 and sets the recording time interval based on this detected speed. The image recording apparatus 10 is further provided with: A command discriminating unit 14 which informs the other parts of the image recording apparatus of the recording time interval, thereby controlling them; a memory unit 16 for temporarily storing the image information sent from the image information source 12; a gradation transforming unit 18 which transforms the image information into a gradation signal; a modulating unit 20 which modulates the laser beam using the gradation signal as a modulating signal; a motor controlling circuit 22 which changes and controls the transport speed of the recording material A in accordance with the recording time interval that has been set; a recording mechanism 30 which performs the recording of the image by exposing the recording material A and comprises the laser beam sources 28R, 28G, and 28B, a driving circuit 24 which drives each of the laser beam sources based on the image information that has been modulated by the modulating unit 20, and a polygonal mirror 26 which serves as an optical deflector.

The command discriminating unit 14 detects the transmission speed of the image information coming from the image information source 12 and sets the recording time interval for image recording based on the detected speed. This time interval is set to a time corresponding to the scanning period of the optical deflector, that is, to an integer multiple of the period of rotation of the polygonal mirror 26 as shown by the example in the figure. The command discriminating unit 14 also sends information on the recording time interval to the memory unit 16, gradation transforming unit 18, modulating unit 20, and motor controlling circuit 22 thereby controlling each of these.

It is noted here that the image information transmission speed as used in the present invention can either be the transmission speed or the time required to transmit a predetermined unit of information, for example, one line of image information.

The recording time interval is the time interval between the start of the image recording session of a predetermined unit of image information, and the start of the image recording session of the following predetermined unit of image information. As mentioned earlier, the recording time interval is set in accordance with the transmission speed of the image information. In other words, in the image recording apparatus 10 of the present invention, the recording time interval is set such that, during the interval that includes the start of a particular image recording session up to the start of the next image recording session, the transmission of a predetermined unit of image information from the image information source 12 is completely done.

Therefore, in the image recording apparatus 10 of the present invention, after completion of a particular image recording session, during the interval starting from the point of completion of a particular image recording session up to the start of the next image recording session, the laser beam sources 28R, 28G, and 28B are not driven to operate, or are in a non-recording state (or in a state wherein the currents flowing through the laser sources are just the bias currents).

For example, in the image recording apparatus 10, it is assumed that the scanning period is 2.0 ms/line, the transmission time (image information transmission speed) of the image information source 12 is 10.0 ms/line maximum, and the amount of image information in a predetermined unit is one line of image information.

The apparatus shown as an example in the figure has a toggle memory (to be described in more detail later) in the memory unit 26 which stores the equivalent of two lines of image information. In this case, the command discriminating unit 14 can set the recording time interval to 10.0 ms as the time it takes to record the image information stored in one of the memories 16a and the time it takes to complete the transmission of one line of image information into the other memory 16b, both recording and transmission being done simultaneously within the specified interval.

Figure 2:
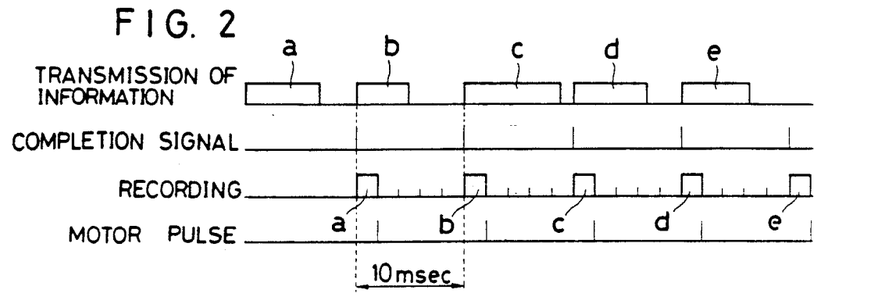
FIG. 2 is a time chart showing the operation of the image recording apparatus shown in FIG. 1.

In other words, as shown in FIG. 2, in this case, after one line of image (one scan, corresponding to one face of the polygonal mirror 26) has been recorded, there is a non-recording interval corresponding to 4 lines of image (4 scans, corresponding to 4 faces of the polygonal mirror 26). The recording operation consists of a repetition of this basic procedure.

Therefore, the transmission of a predetermined unit of image information can be completed while the apparatus is in a non-recording state, and image recording can be done at a constant rate without having to change the scanning period (speed of rotation of the polygonal mirror 26) or having to stop the transport and scanning of the recording material A as the transport speed and scanning of the recording material A are adjusted in accordance with the recording time interval.

In the image recording apparatus 10 of the present invention, the aforementioned recording time interval is set to an integer multiple of the scanning period, that is, to an integer multiple of the period of rotation of the polygonal mirror 26 in the embodiment of the apparatus shown in the figure.

By setting the recording time interval in the manner mentioned above, there is no possibility of the image recording operation's being performed midway through a scanning line even if the image recording and non-recording states are alternated. Thus a good image recording performance can be realized.

Also, as shown in FIG. 2, the command discriminating unit 14 generates and sends a completion signal to the image information source 12 after each recording time interval. In the embodiment shown in the figure, the image information source 12 is configured to receive this completion signal and then transmit the image information to the memory unit 16.

The memory unit 16 serves as a temporary storage for the predetermined unit of image information that has been transmitted by the image information source 12. In the image recording apparatus 10, two memories 16a and 16b, each capable of storing one line of image information, are provided. These two memories make up a toggle memory that stores two lines of image information and is configured to be capable of switching—the memories 16a and 16b are configured to alternatively switch to store and read operations by means of the toggle switches 32a and 32b.

The switching of the toggle switches 32a and 32b is such that they operate under the control of the command discriminating unit 14, in accordance with the recording time interval that has been set.

In the memory unit 16, while the recording of the image information stored in one of the memories, for example, memory 16b in the case wherein the toggle switch 32b is connected to the memory 16b as shown in the example in the figure (FIG. 2, recording, "P"), the other memory 16a is connected to the image information source 12 by means of the toggle switch 32a and is configured to store the image information being transmitted to it (FIG. 2, transmission of information, "b").

As mentioned earlier, since the transmission of the image information takes longer than image recording, even when the recording of the image information from memory 16b has been completed, image information from the image information source 12 continues to be transmitted to memory 16a and storage of this image information continues to be done. However, the image recording apparatus 10 of the present invention is in a non-recording state during this period within the recording time interval, and the apparatus is configured such that the transmission of the predetermined unit of image information is completed before the next image recording session.

When the predetermined recording time interval has passed after the start of a particular image recording session, the command discriminating unit 14 sends a signal to the memory unit 16 and the toggle switches are actuated. The toggle switch 32b becomes connected to memory 16a, and, at the same time, the toggle switch 32a becomes connected to memory 16b. While recording of the image information stored in memory 16a is being done (FIG. 2, recording, "b"), memory 16b is receiving and storing the image information being sent by the image information source 12 which starts transmission after receiving a completion signal from the command discriminating unit 14 (FIG. 2, information transmission, "c").

Therefore, in the image recording apparatus 10 of the present invention, the memory unit 16 is required only to have the capacity to store the predetermined unit of image information and the speed of storage to do so within the recording time interval. Put in another way, it is necessary to set the recording time interval in accordance with the capability of the memory unit 16.

Figure 3:
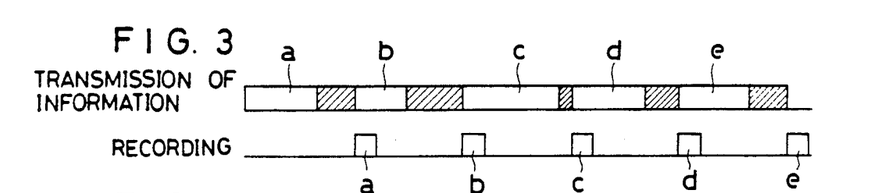
FIG. 3 is a time chart showing the operation of another embodiment of the image recording apparatus of the present invention.

In the example described above, the image information source 12 is configured to start transmitting the image information to the memory unit 16 upon receiving the completion signal from the command discriminating unit 12. However, when the image information source 12 and the memory unit 16 make a handshake every time a unit of image information is transmitted, instead of the aforementioned completion signal, the timing for the transmission of the image information from the image information source 12 to the memory unit 16 can be obtained by stopping (standby operation) the transmission of the image information from the image information source 12 during the intervals indicated by the shaded portions shown in FIG. 3. This is done by extending the handshake signal after the transmission of the last unit up to the point immediately before the start of the next recording session (after the recording time interval has passed).

Figure 4:
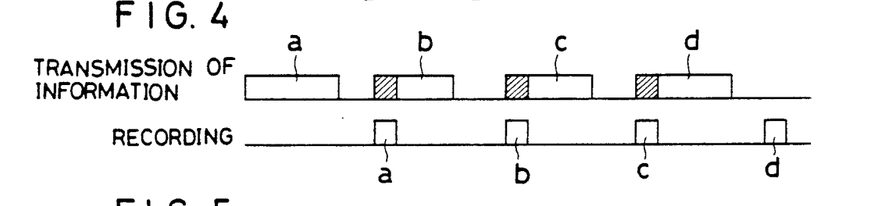
FIG. 4 is a time chart showing the operation of still another embodiment of the image recording apparatus of the present invention.

Also, when the image information source 12 and the memory unit 16 make a handshake every time a unit of image information is transmitted, a memory that can store only one line of image information can be used as the memory unit 16 instead of the toggle memory mentioned earlier. This can be achieved by letting the handshake signal, at the start of the unit of image information that is transmitted, indicate a standby state until after the completion of a recording session (within the recording time interval), that is, during the interval shown by the shaded portions in FIG. 4.

Further, the memory unit 16 is not limited to the aforementioned toggle memory that can store two lines of image information. A toggle memory that can store two or more lines, or one memory that can store one line of image information, can be used. In other words, in the present invention, one only has to ascertain that the recording time interval is set in accordance with the capability of the memory unit 16.

The image information read from the memory unit 16 is subsequently sent to the gradation transforming unit 18 where it is transformed into a gradation signal appropriate for image recording on the recording material A then sent to the modulating unit 20.

An actuating signal is sent by the command discriminating unit 14 to the gradation transforming unit 18 in accordance with the recording time interval. The gradation transforming unit 18 is configured to be actuated by the actuating signal in accordance with the recording time interval and it transforms the received image information into gradation signals.

The gradation signal coming from the gradation transforming unit 18 is subsequently sent to the modulating unit 20. The modulating unit 20 modulates the laser beams emitted by the laser beam sources 28R, 28G, and 28B in the recording mechanism 30 in accordance with the received gradation signals, and sends the modulated signal to the driving circuit 24 of the recording mechanism 30.

An actuating signal is sent by the command discriminating unit 14 to the modulating unit 20 in accordance with the recording time interval, and the modulating unit 20 is actuated by this signal in accordance with the recording time interval.

As mentioned earlier, since the image recording apparatus 10 of the present invention operates by repetition of a state of recording of a predetermined unit of image information such as a line, and a non-recording state in accordance with the recording time interval that has been set, it is necessary to make each of the laser beam sources emit the laser beams in accordance with the recording time interval. To achieve this, the modulating unit 20 must detect the signal related to the recording time interval, send the modulated signal to the driving circuit 24 of the recording mechanism 30 in accordance with this recording time interval, and control the emission of the laser beams from the laser beam sources.

The recording mechanism 30 performs the image recording operation. It emits laser beams in accordance with the modulated signal transmitted by the modulating unit 20. These laser beams are reflected and deflected in the main scanning direction by the polygonal mirror 26 to two-dimensionally scan and expose the recording material A being scanned and transported in the direction shown by the arrow "P".

This type of recording mechanism 30 basically has a driving circuit 24 that drives each of the laser beam sources in accordance with the modulated signal sent by the modulating unit 20; a laser beam source 28R that emits a laser beam having a wavelength corresponding to the exposure of red light for producing cyan color, a laser beam source 28G that emits a laser beam having a wavelength corresponding to the exposure of green light for producing magenta color, and a laser beam source 28B that emits a laser beam having a wavelength corresponding to the exposure of blue light for producing yellow color; and a polygonal mirror 26 that serves as an optical deflector for reflecting and deflecting the laser beams emitted by the laser beam sources in the main scanning direction. The deflected beam is a composite of the three individual beams with their optical axes brought into alignment with one another.

The driving circuit 24 drives each of the laser beam sources to make them emit a laser beam in accordance with the modulated signal transmitted by the modulating unit 20. Since the image recording apparatus of the present invention performs the image recording operation in accordance with the recording time interval that has been set, the modulated signal from the modulating unit 20 is sent to the driving circuit 24 in accordance with the same recording time interval, and the driving circuit 24 actuates each of the laser beam sources in accordance with this recording time interval.

Each of the laser beams, emitted by the laser beam sources 28R, 28G, and 28B passes, through and is shaped by respective collimator lenses 34R, 34G, and 34B. Subsequently, after the beams are aligned by a mirror 36R and dichroic mirrors 36G and 36B at their optical axes to form one composite beam, this composite beam is reflected by a mirror 38 in a predetermined direction and launched onto the polygonal mirror 26.

The laser beams incident upon the polygonal mirror 26 are reflected and deflected in the main scanning direction, pass through an "f-theta" lens 40, and are bent downward by a rectangular mirror 42 to two-dimensionally scan and expose the recording material A that is being transported in the subscanning direction indicated by the arrow "P", causing the image to be recorded on the recording material A.

In the image recording apparatus 10 of the illustrated example, the recording material A is held and transported by a pair of rollers 44.

This pair of rollers 44 is connected to a motor 46 that serves as a driving source. The speed of rotation of this motor 46 is changeable and is controlled by a motor controlling circuit 22. A control signal corresponding to the recording time interval set by the command discriminating unit 14 is sent to the motor controlling circuit 22, and the motor controlling circuit 22 causes the speed of rotation of the motor 46 to change in accordance with the recording time interval.

As mentioned earlier, the image recording apparatus 10 of the present invention operates by repetitions of a state of recording an image on a recording material A being scanned and transported at a constant speed, and a non-recording state. Consequently, the interval of the scanning lines for image recording must be set appropriately and, to be able to perform good image recording, the speed of scanning and transport of the recording material A must be adjusted appropriately in accordance with the recording time interval that has been set.

The amount of adjustment of the transport speed of the recording material can be suitably determined by setting the interval of the scanning lines to be equal to that of normal image recording. In the previous example, since there is a non-recording interval corresponding to four lines of image information after each recording of one line of image, the transport speed of the recording material can be set to 1/5 of the normal speed.

Therefore, in the image recording apparatus 10 in the illustrated example, the motor 46 is not limited to a particular type as long as it is one that has a changeable speed of rotation, and various motors such as a pulse motor, and others, can be employed.

In the image recording apparatus that makes use of a laser beam, a bias current small enough so as not to let the recording material A be under constant exposure (coloring) is allowed to flow through each of the laser beam sources in order to obtain a stable laser beam output.

However, as mentioned earlier, the image recording apparatus 10 of the present invention performs image recording at the aforementioned recording time interval with a non-recording state within said interval, and the transport speed of the recording material A is made slow in accordance with the recording time interval. Therefore, when the bias current is allowed to flow during the non-recording period, the recording material A will become exposed and will color.

Because of this, in the image recording apparatus 10 of the present invention, the bias currents flowing through each of the laser beam sources is preferably controlled to flow only at least during the effective recording period within an interval starting from a point corresponding to the completion point of the effective image recording period of the line immediately preceding the line to be recorded, and ending at a point corresponding to the starting point of effective image recording period of the line immediately following the line to be recorded.

Figure 5:
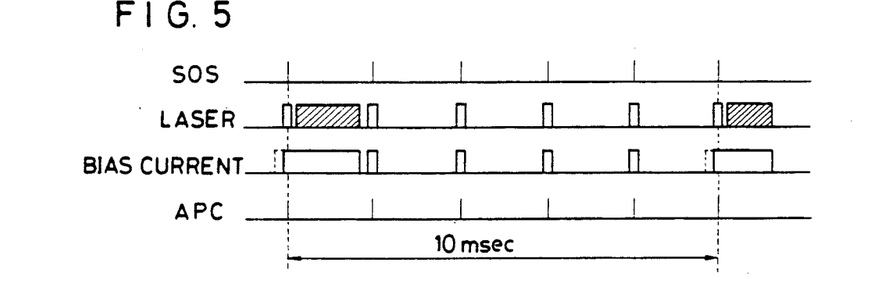
FIG. 5 is a time chart showing the energy supplying operation to light source of the image recording apparatus shown in FIG. 1.

In other words, in the image recording apparatus 10 of the present invention, in order to make the laser beams used for image recording stable, as shown by the shaded portions in FIG. 5, the bias currents allowed to flow through each of the laser beam sources must be controlled to flow during the period of emission of the laser beams within the recording time interval. Except for these periods, that is, during the non-recording periods, the bias current must not be allowed to flow. Now, in FIG. 5, the bias current flowing every 2 ms is a bias current flowing through the laser beam sources that is used to detect the SOS (start of scanning), and is different from the bias current mentioned above.

Also, as shown by the dashed lines in FIG. 5, the bias current for stabilizing the laser beams may be allowed to flow through the laser beam sources starting from the point corresponding to the point of completion of the effective image recording period in the recording time interval of the line immediately preceding the line to be recorded.

In the image recording apparatus 10 of the present invention, as in the conventional image recording apparatus, the bias current may be made to flow continuously into the laser beam sources and then employ a construction in which the laser beams being emitted through the action of the bias current can be blocked by means of a shutter which can come in various types.

By employing the construction described above, the image recording apparatus 10 of the present invention is able to produce good images with stable concentration.

In the operation of the image recording apparatus 10 described above, the command discriminating unit 14 detects the transmission speed of the image information coming from the image information source 12 and sets the recording time interval. However, the present invention is by no means limited to this type of operation, and the recording time interval may be set in relation to the image information source by means of an external input.

Figure 6:
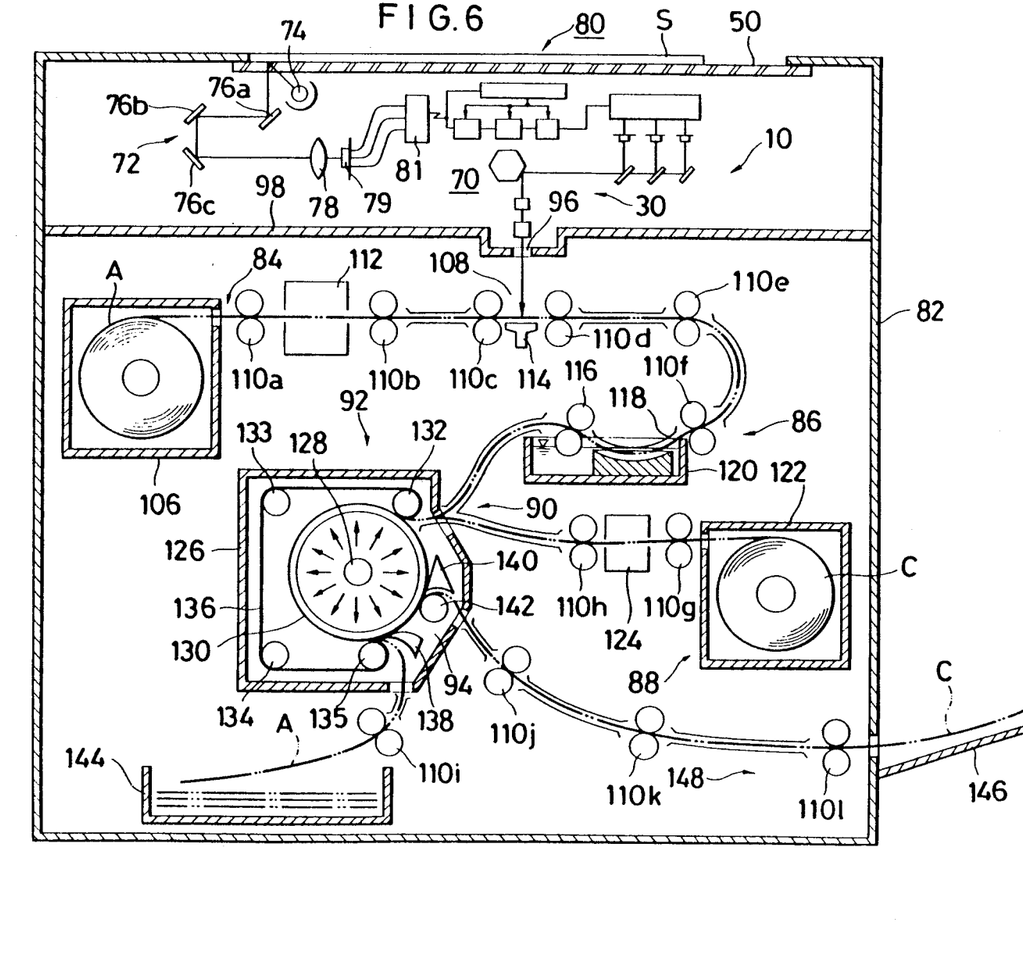
FIG. 6 is a schematic diagram of a copying machine equipped with the image recording apparatus shown in FIG. 1.

FIG. 6 shows a copying machine employing the described image recording apparatus 10 of the present invention. For the recording material, this machine uses a recording material (light-sensitive material) A which has a light-sensitive layer and a transfer forms image on an image-receiving material having a receiving layer in an image-forming solvent such as water, and requires a thermo-development process.

The housing 82 of the copying machine 80 is provided with a recording material supply unit 84 containing the recording material A; an image exposing unit 70 that exposes the recording material A to form a latent image after reading and processing the image information from a document; and an image forming unit that comprises a water-applying section 86 in which water is applied onto the recording material A, an image-receiving sheet supply section 88 which contains the image-receiving sheet C, a superposing section 90 in which the image-receiving sheet is superposed on the recording material A, a thermal development/transfer section 92 in which the superposed recording material A and the image-receiving sheet C are heated, and a detaching section 94 for separating the image-receiving sheet C from the recording material A.

The document S is placed on a transparent platen 50 provided on top of the housing 82. The image exposing unit 70 is positioned below the platen 50.

The image exposing unit 70 comprises a reading mechanism 72 and the image recording apparatus 10 of the present invention described earlier.

In the copying machine 80 of the illustrated example, the reading mechanism 72 performs the operation of the image information source 12 shown in FIG. 1 of the image recording apparatus 10 of the present invention.

The reading mechanism 72 comprises a light source 74 that is movable in the scanning direction beneath the platen 50, a mirror 76a that moves together with the light source 74, mirrors 76b and 76c that move in the same direction as the light source 74 but at one-half its speed, an imaging lens 78, a CCD sensor 79, and a control circuit 81.

The control circuit 81 is connected to the image recording apparatus 10 of the present invention.

The image recording apparatus 10 is the same as that shown in FIG. 1. Therefore, the constituent parts will not be described in detail; suffice it to say that the same parts will be indicated by the same numbers.

In the copying machine of the illustrated example, the light source 74 illuminates the underside of the original S as the light source scans the document in the subscanning direction. The light reflected from the document is reflected by the various mirrors, focused by the imaging lens 78, and launched into the CCD sensor 79 where the light is time-divided and subjected to photoelectric conversion. The resulting data is then sent to the control circuit 81. The control circuit determines the conditions for the emissions from each of the laser beam sources according to the received data and sends a signal to the image recording apparatus 10 of the present invention.

The image exposing unit 70 is optically isolated from the other parts of the copying machine by means of a partition 98 except for an aperture 96 through which the light beam for exposing the recording material A will pass.

A detachable magazine 106 containing a roll of the recording material A is loaded in the light-sensitive material supply unit 84. The recording material supply unit 84 is also provided with pairs of rollers 110a-110d for transporting the recording material A up to an exposure position 108. Here, a cutter 112 for cutting the recording material A into predetermined lengths is provided between the roller pairs 110a and 110b. Also, an exposure table 114 provided between the roller pairs 110c and 110d faces the exposure aperture 96 formed on the partition 98 enclosing the image exposing unit 70.

Now, as in FIG. 1, a motor controlling circuit 22 is connected to the driving source (not shown in the figure) of the pairs of rollers. The controlling circuit 22 controls and adjusts the transport speed of the recording material A in accordance with the recording time interval that has been set.

A transport path comprising a pair of rollers 110e and a guide plate is provided ahead of the exposure position 108 (the term "ahead of" as used here means downstream, that is, in the direction of motion of the recording material, etc.).

The recording material A in the exposure position 108 is subjected to two-dimensional imagewise exposure to form a latent image. The recording material A with the latent image formed on it is transported to the water applying section 86 via the aforementioned transport path.

The water applying section 86 serves to facilitate the transfer of the latent image formed on the recording material A. It comprises a water tank 120 filled with water, a guide plate 118 for guiding the recording material A through the water, a pair of roller 110f for transporting the recording material A along the guide plate 118, and a pair of squeezing rollers 116 that squeezes off the excess water from the recording material A which has swelled with the water it has absorbed.

The recording material A applied with water is transported to the superposing section 90 by the pair of squeezing rollers 116.

The image-receiving sheet supply section 88 that supplies the image-receiving sheet C is provided on the right-hand side of the housing 82. The image-receiving sheet supply section 88 is loaded with a magazine 122 containing a roll of the image-receiving sheet C. The image-receiving sheet C is drawn from the magazine 122 by means of a pair of roller 110g and is cut into predetermined lengths by a cutter 124 provided ahead of the pair of rollers 110g.

The cut image-receiving sheet C is transported to the aforementioned superposing section 90 by a pair of rollers 110h.

The thermal development/transfer section 92 is provided ahead of the superposing section 90. This thermal development/transfer section 92 heats the superposed recording material A and image-receiving sheet C to develop the latent image on the recording material A and then transfer the developed image onto the image-receiving sheet C.

The thermal development/transfer 92 is enclosed by a heat-insulating partition 126 and includes a hollow cylindrical heating drum 130 containing a halogen lamp 128 and an endless belt 136 that is wound around the heating drum 130 about an angle of about 270 degrees and is supported by four belt-supporting rollers 132, 133, 134, and 135. The recording material A and the image-receiving sheet C are superposed while they are being heated and, by this heating process, the latent image on the recording material A is developed and transferred in color onto the image-receiving sheet C.

The detaching section 94 is provided within the space defined by the partition 126. This detaching section 94 comprises a first detaching claw 138 for separating the recording material A from the image-receiving sheet C, a second detaching claw 140 for separating the image-receiving sheet C from the heating drum 130, and a roller 142 for discharging the image-receiving sheet C out of the partition 126.

A disposal tray 144 for containing the recording material A that has been separated by the detaching claw 138 from the image-receiving sheet C and a pair of rollers 110i that leads the recording material A into the disposal tray 144 are provided on one side ahead of the thermal development/transfer section 92.

Also, on another side ahead of the thermal development/transfer section 92 are provided a receiving tray 146 for receiving the image-receiving sheet C that has undergone heating, and pairs of rollers 110j, 110k, and 110l for transporting the image-receiving sheet to the receiving tray 146. The image-receiving sheet C with the image transferred onto it is led to and contained in the receiving tray 146.

The image recording apparatus 10 of the present invention has been described above using a representative case wherein it was applied to a copying machine that uses a type of recording material A which is heated to develop and transfer an image onto an image-receiving material having an image-receiving layer in the presence of an image-forming solvent such as water, and others. It should be understood, however, that the color image recording apparatus of the present invention is also applicable to other forms of image recording apparatuses like copying machines and printers such as image-forming apparatuses that make use of the same type of image recording material A, copying machines, and image forming apparatuses that make use of electrophotography and silver halide photographic materials.

The image recording apparatus related to the present invention has been constructed as described above but the present invention is in no way limited to the aforementioned construction. Needles to say, it is possible to add various modifications in design and other improvements within a scope that does not depart from the spirit of the present invention.

As described in detail above, the image recording apparatus of the present invention detects the recording time interval of a predetermined unit of image information and the transmission speed of the image information from various types of image information sources and, based on the image information transmission speed and the scanning period of the optical deflector, sets the recording time interval for image recording to an integer multiple of the scanning period of the optical deflector. The transport speed of the recording material is likewise determined and controlled based on the aforementioned recording time interval.

Consequently, an inexpensive memory with a small storage capacity, for example, one that can store one or two lines of image information, can be used. Thus, compared to the prior image recording apparatus which required an expensive, large-capacity memory needed to store one page of image information, a cheap image recording apparatus can be realized, particularly very cheap for color image recording apparatuses which process a very large amount of image information.

Also, since the recording time interval is set according to the speed of transmission of the image information coming from the image information source as mentioned above, various image information sources with different image information transmission speeds can be connected regardless of the fact that a memory with small storage capacity is used.

Further, even when the timing between the transmission of the image information and image recording is adjusted through the setting of the recording time interval, a stable image recording performance can be maintained by keeping the operating speed of the optical deflector constant and also by keeping the scanning speed of the recording material constant during image recording.

It is also preferred that the energy, for example, the bias current for stabilizing the light beam, be supplied to the light source at least during the effective image recording period within the interval starting from a point corresponding to the point of completion of the effective recording period of the line immediately preceding the line to be recorded and ending at a point corresponding to the starting point of the effective image recording period of the line following the line to be recorded. By keeping the unwanted laser beam from illuminating the recording material during the non-recording state, a good and stable image, without unevenness and with better color concentration, can be recorded.

What is claimed is:

1. An image recording apparatus that receives an image information coming from an image information source, modulates a light beam with the received information as a modulating signal, deflects a modulated light beam in a main scanning direction by means of an optical deflector, and records an image on a recording material being scanned in a direction generally perpendicular to the main scanning direction; said image recording apparatus comprising:

a means for setting the recording time interval to an integer multiple of the scanning period of the optical deflector, based on a speed of transmission of the image information coming from the image information source, a means for receiving a predetermined unit of the image information transmitted from the image information source within the recording time interval, a means for recording the image corresponding to the image information at each recording time interval, and a means for changing the scanning speed of the recording material in accordance with the recording time interval.

2. An image recording apparatus for recording image information transmitted from an information source on a recording material, wherein the image information transmitted from the information source is received by a light beam-source, said image information being transmitted such that a predetermined unit of image information is transmitted at a predetermined speed within a predetermined recording time interval; the image information received by the light-beam source is converted to a light beam corresponding to the image information; the light beam is deflected by means of an optical deflector in a main scanning direction, the optical deflector being moved at a predetermined scanning cycle such that the recording time interval correspond to at least one scanning period; and an image is recorded at the predetermined recording time interval on the recording material which is transported in a direction perpendicular to the main scanning direction for a sub-scanning;

said image recording apparatus being provided with a means for setting the recording time interval to an integer multiple of the scanning period of the optical deflector, based on the image information-transmission speed from the information source;

a means for receiving the predetermined unit of the image information transmitted from the image information source within the recording time interval;

a means for recording the image on the recording material at the predetermined time interval within an effective image recording period; and a means for adjusting the sub-scanning speed of the recording material to correspond to the recording time interval.

3. The image recording apparatus according to claim 1 or 2 wherein said recording time interval correspond to at least two scanning periods of the light deflector, and the image recording is carried out within one scanning period of the recording time interval, and no recording is carried out during other scanning periods within the same recording time interval.

4. The image recording apparatus according to claim 3 wherein said recording time interval correspond to one image recording scanning line and the image recording is carried out within one scanning period of the recording time interval, and an energy at predetermined level independent of the level of the image information is supplied to the light-beam source at least for the image recording period included within the period starting from the position in non-recording scanning period immediately before the image recording scanning period corresponding to the completion position of the effective image recording period ending at the position in non-recording scanning period immediately after the image recording scanning period corresponding to the starting position of the effective image recording period.

* * * * *